Oct. 29, 1935.  F. W. CARPENTER  2,019,293
ELECTRICAL FLATIRON
Filed March 27, 1933  3 Sheets-Sheet 1

Inventor
Frank W. Carpenter
By his Attorneys

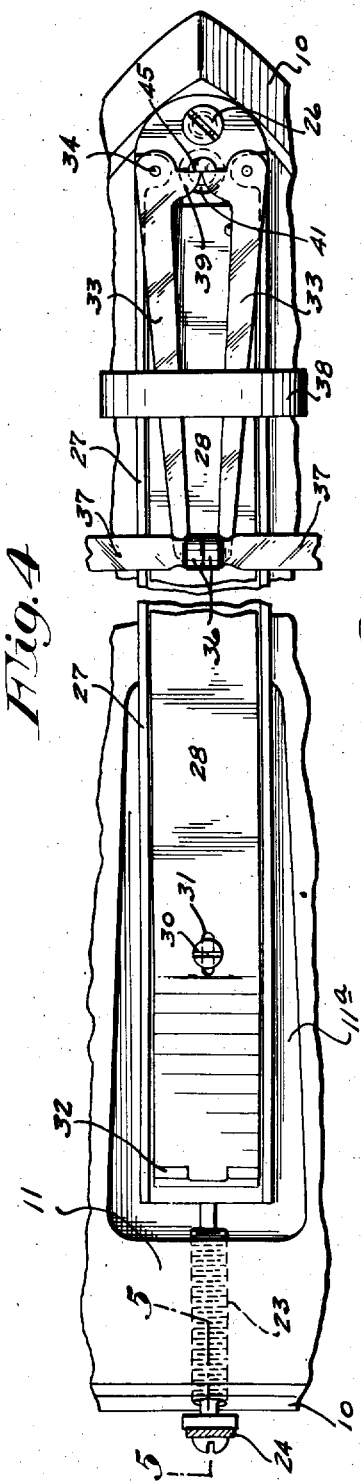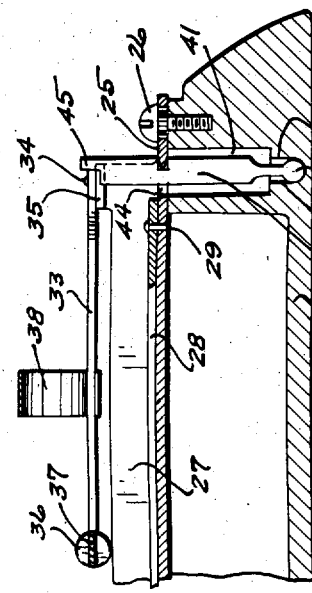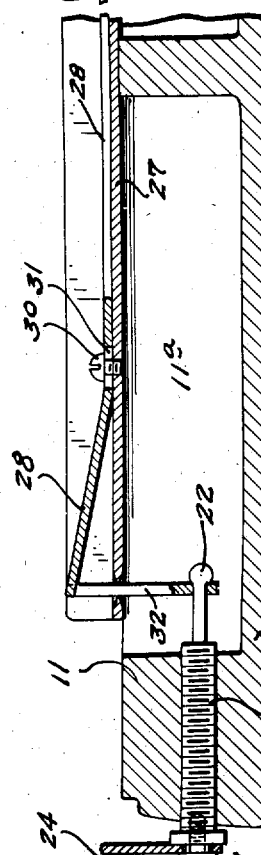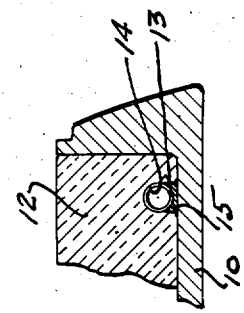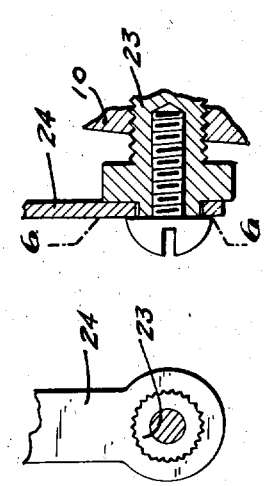

Oct. 29, 1935.    F. W. CARPENTER    2,019,293
ELECTRICAL FLATIRON
Filed March 27, 1933    3 Sheets—Sheet 3

Inventor
Frank W. Carpenter
By his Attorneys

Patented Oct. 29, 1935

2,019,293

UNITED STATES PATENT OFFICE 2,019,293

ELECTRICAL FLATIRON

Frank W. Carpenter, Minneapolis, Minn., assignor of one-half to Maurice H. Graham, St. Louis Park, Minn.

Application March 27, 1933, Serial No. 662,861

16 Claims. (Cl. 219—25)

My invention relates to the temperature control of electrically heated articles and is particularly directed to an improved means for the automatic temperature control of electrically heated flatirons, but is capable of more general application.

The automatic temperature control of electrically heated flatirons involves certain features that are common to various kinds of electrically heated devices and in addition thereto, presents certain other problems that are peculiar to flatirons. Hence my invention is here illustrated in its application to flatirons.

An ideal switch actuator or circuit controller for electrically heated flatirons, for example, is one that will be influenced by and only by expansion and contraction of the sole plate or base. To obtain such a result requires an element or controller for the switch actuator that extends from quite distant points, preferably from a point near the heel to a point near the toe of the sole plate. If a metal or material could be found that would be absolutely free from expansion or contraction under the varying temperatures to which the flatiron should be subjected in use, then the problem could be easily solved; but so far as I am informed, there is no material available, which, in itself, has such non-expanding and contracting qualities.

Hitherto, the problem of thermostatic control of temperature of electrically heated flatirons has been solved in a more or less satisfactory way by two schemes, to wit:

(a) By the use of a thermally expansible and contractable switch actuating element, operated in accordance with temperature to which the said switch-actuating element was subjected, but without any definite relation to the temperature or expansion and contraction of the sole plate or base member; and (b) By an arrangement wherein a switch controlling rod or bar of invar metal (assumed to have no expansion and contraction under the varying temperatures) was used as a switch control element.

The first above noted scheme has been very unsatisfactory for the reason that it has been practically impossible to determine the exact and uniform relative temperatures of the flatiron base, for example, and the switch-actuating or controlling element, and from which it has followed that the regulation of the temperature of the sole plate of the flatiron could not be accurately controlled. The second scheme has been found unsatisfactory, and in many instances entirely failed, in practical performance, for the reasons that the operating temperature of flatiron bases should vary from 200 degrees F. to as much as 600 degrees F., and invar, while it expands and contracts very slightly at room temperatures, does, at temperatures above 200 degrees F., expand very considerably and at an unconstant and increasing rate as temperatures rise above 200 degrees F.

My invention makes a radical departure from the above noted schemes in that I provide and employ a device herein designated as an expansion neutralizer and which is so combined with the switch of the electric supply circuit that any and all expansion, except that that takes place in the sole plate of the flatiron, is neutralized and the switch will be actuated solely by and in accordance with expansion and contraction in the sole plate. This arrangement makes it possible to control the application of heat to the sole plate of the flatiron to exactly the desired temperature.

Further analysis of the invention and disclosure of the nature thereof will be made in connection with the accompanying drawings, which illustrate a commercial embodiment of the invention in an electrically heated flatiron.

In the drawings, wherein like characters indicate like parts throughout the several views:

Fig. 3 is a vertical section taken longitudinally and centrally through those portions of the iron that are illustrated in Fig. 2; some parts being broken away;

Fig. 4 is a fragmentary view in plan of the parts shown in Fig. 3;

Fig. 5 is a section taken approximately on the line 5—5 of Fig. 4;

Fig. 6 is a detail in section on the line 6—6 of Fig. 5;

Fig. 9 is a fragmentary section taken on the line 9—9 of Fig. 7.

Figure 1:
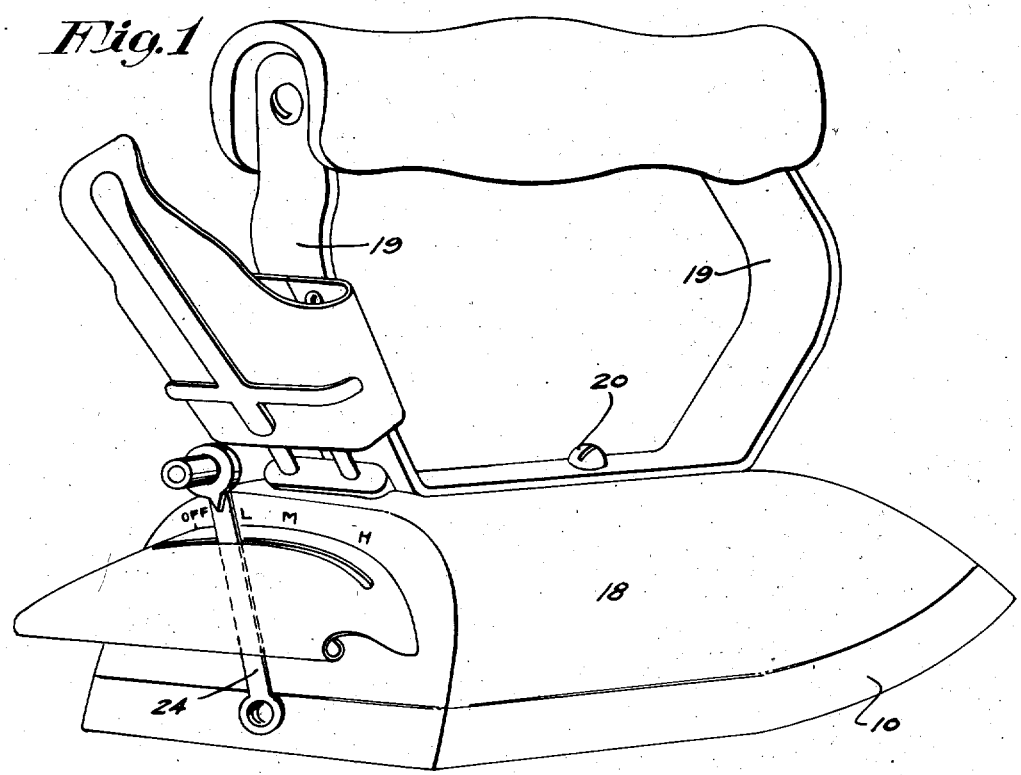
Fig. 1 is a perspective showing the improved flatiron embodying the invention.

The sole plate of the flatiron is indicated by the numeral 10 and may take various forms. As shown, it is formed with a bifurcated central flange 11 that leaves spaces on each side thereof for the reception of insulating tiles 12. These tiles are made out of very light and porous refractory material such as made from certain light clays, and on their under sides are formed with tortuous channels 13 that receive the heating elements 14, as best shown in Fig. 9. Preferably, these heating elements 14 are coils of nichrome wire that are kept out of contact with the sole plate by said insulating tiles and by thin layers of cement 15 applied as best shown in Fig. 9.

Figure 2:
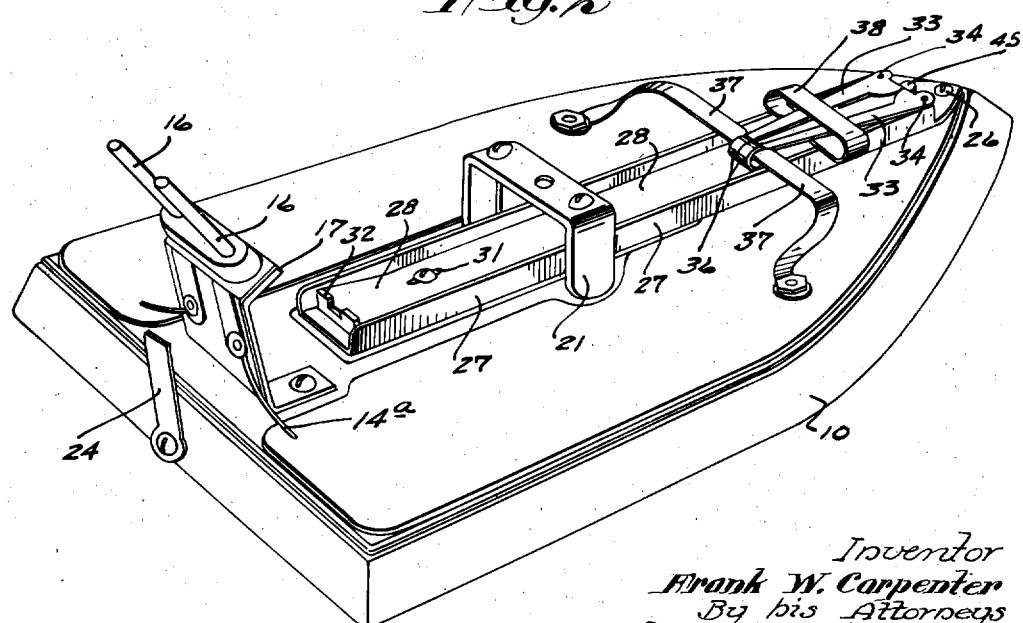
Fig. 2 is a perspective showing the sole plate, the switch and immediately associated parts, the top portion of the iron being removed.

The heating elements 14 at their front ends are arranged to be connected through a switch to be hereinafter described; but their rear end terminals 14ª, see Fig. 2, are connected in the customary way to socket-engaging pins or terminals 16 mounted on a supporting bracket 17 and insulated therefrom in the customary or well-known manner. Bracket 17 is rigidly secured to the rear portion of central flange 11.

The casing or upper portion 18 of the flatiron as is usual, is a hollow shell. This shell and the handle 19 are shown as rigidly connected together and anchored to the sole plate 10 by a screw 20 that is engaged with a bridge bar 21, which in turn, is rigidly anchored to the intermediate portion of the flange 11.

Figure 7:
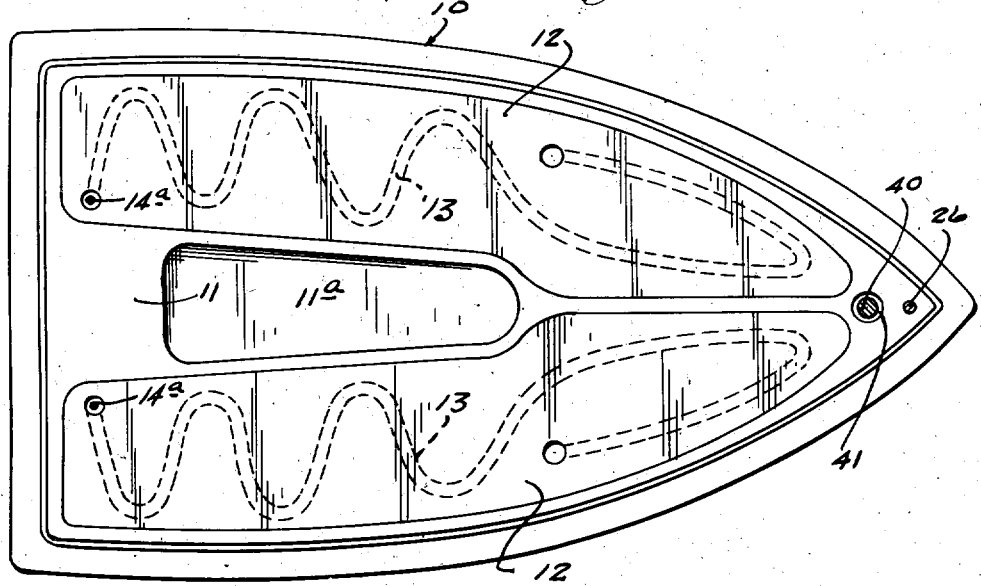
Fig. 7 is a plan view showing the sole plate of the flatiron with the insulating tiles and heating elements in place, but with other parts removed.
Figure 8:
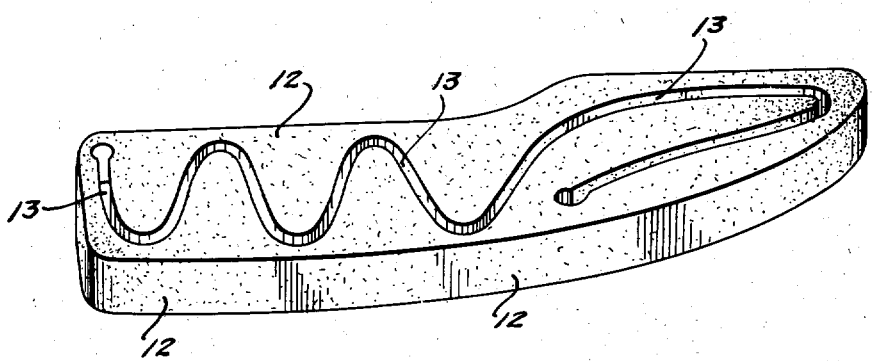
Fig. 8 is a perspective showing one of the insulating tiles removed from the sole plate.

By reference to Fig. 7, it will be noted that the central flange 11 is bifurcated to afford a central cavity 11ª. Located at the heel or rear portion of the sole plate and projecting into the rear portion of said cavity 11ª is a rear abutment, which as shown, is afforded by the head 22 of a screw 23 that works through the rear portion of the sole plate and makes the said abutment 22 longitudinally adjustable for a purpose which will hereinafter appear. As shown, the abutment screw 23 at its projecting rear end is provided with a lever 24 for oscillating the same to adjust the abutment.

Mounted loosely on the top of the front end of the sole plate 10 is a front abutment 25 the relative position of which with respect to rear abutment 22 is unaffected by expanding and contracting movements of the sole plate, but as shown, is prevented from getting out of place by causes other than expansion, by means of a screw 26 passed through an enlarged hole in said abutment 25 and screwed into the toe or front end of said sole plate. This front abutment 25, as will presently appear, constitutes an important element of the switch actuator proper.

To accomplish the above stated objects of my invention, it is necessary to provide means whereby the so-called front abutment 25, regardless of expansions and contractions of the sole plate or other parts of the iron will maintain a constant unchanging position and distance from the so-called rear abutment 22. This I accomplish by the so-called neutralizer, a preferred form of which is illustrated in the drawings and which, as shown, comprises as follows:

A steel bar 27, preferably in the form of a channel, is loosely mounted on the top of the sole plate 10; and a flat brass bar 28 is located within the channel and closely engaged with the top of said bar 27. The two bars 27 and 28 are rigidly tied together at their front ends by a rivet 29 or by other suitable means. In this preferred arrangement, the front abutment 25 is formed by the front end portion of the bar 27 and is so close to the rivet connection 29 that any expansion or contraction betwen the said rivet point and the front edge of said front abutment will be negligible.

The two bars 27 and 28 being of different metals will have different co-efficients of expansion, but the said bars at the rivet point 29 cannot possibly change or shift their relative positions. The rear end of bar 28 is shown as raised above the rear end of bar 27 for an important reason. A screw 30 that is screwed into the bar 27 and works loosely through a slot 31 in the bar 28, prevents the latter from being lifted from said bar 27, but without interfering with the different expanding connections of said bars. A short lever 32 is fulcrumed in and works through a slot formed in the rear portion of the bar 27. The upper end of this lever has interlocking or other contact with the raised rear end of bar 28 and the lower end of said lever is mounted on the stem of the screw 23 and is anchored against the head or abutment 22.

The switch herein shown may take different forms, but as here shown, is made up of two quite long contact arms 33 pivoted at 34 to lugs 35 formed on the upper ends of the side flanges of bar 27. At their free ends, these levers are shown as provided with flat contact tips 36 that are insulated from the respective arms and are electrically connected to thin and very flexible brass circuit-conducting ribbons 37 that are electrically connected to the front end terminals of the respective heating elements 14. A spring 38, shown as formed by a flat piece of spring steel bent into approximately C-shape, is connected to the respective arms 33 at its ends and exerts considerable force tending to hold the contact tips 36 engaged. At their pivoted ends, the levers 33 are provided with short inwardly projecting lugs 39 that come nearly but not quite into engagement.

The part herein designated as the switch actuator is in the form of a short upright lever 40 located in a recess 41 formed in the toe or front end portion of the sole plate with the extreme lower end seated in the bottom portion of the sole plate, with its intermediate portion fulcrumed against the front abutment 25, and with its extreme upper end engaged with the lugs 39 of the two switch levers 33. In the particular arrangement illustrated, said lever 40 is provided with a round lower end 42 resting in a seat 43 formed in and extended nearly but not quite to the bottom of the sole plate so that the said lever 40 will be subject to expansion and contraction of the very bottommost portion of the sole plate.

At its intermediate portion, said lever 40 is extended through a slot 44 formed in the front end portion of bar 27 just in back of abutment 25, and the said abutment is shown as extended into a notch formed in the front edge of said lever. Lever 40, as shown, is round in cross-section and its extreme upper end 45 is flattened and is shown as made semi-cylindrical with its flat surface engaging the lugs 39 of switch levers 33. Inasmuch as the switch levers 33 are mounted for pivotal movement in a horizontal plane, the switch will not be jarred either open or closed when the iron is roughly or abruptly set down or picked up.

Summary of operation

It has been stated that in accordance with this invention (the preferred form only of which is herein illustrated), the front abutment 25 will be maintained always at an exact distance from the rear abutment 22 regardless of expansion and contraction of the various parts of the iron. The action of the expansion neutralizer, which makes the above result possible, is as follows: The two bars 27 and 28 of this neutralizer are tied together very close to or, if desired, at the front abutment so that, for example, there will be no perceptible change in position of said front abutment 25 in respect to, for example, the rivet 29, which connects the two bars 27 and 28. When subjected to heat, the two bars 27 and 28, being of different metals, have, of course, different co-efficients of expansion. For example, with the assumed metals steel and brass, the brass bar 28 will expand to a greater extent than the steel bar 27 and these relative rates of expansion will hold good throughout various different temperatures. It is important that the two bars 27 and 28 be so closely associated that they are subjected to the same temperatures, but the temperature to which they will be subjected relative to the temperature imparted to the sole plate of the iron is not at all important.

Under the resultant combined expansion of the two bars 27 and 28, lever 32 will be rocked rearward on the abutment 22 to an oblique position, and when the proportions and arrangement of said lever is correct, the expansion of both bars 27 and 28 will be entirely taken up by said lever 32. The exact proportions and arrangement of said lever 32 might quite readily be determined by a few experiments, but it may be more directly and accurately determined, as follows:

Take the said elements 27, 28 and 32, while separated from the iron, and secure the front ends of said levers and the attached front abutment 25 in a fixed position and then subject the said bars 27 and 28 to heat, which will rock lever 32 to an oblique position, and then mark the oblique line represented by said lever 32. Next, subject the bars 27 and 28 to a much lower degree of temperature, preferably lower than normal atmospheric temperatures, and mark the line represented by the forwardly inclined oblique position of said lever. It will be found that the two oblique lines marked to represent the extreme positions of said lever will intersect at a certain distance from the bottom of bar 27; and that distance will indicate the proper length of said lever and the distance from the bar 27 that abutment 22 should be located. It must be seen that the expansion of both of bars 27 and 28 is taken up or compensated for by movements of lever 32, and that said lever, therefore, acts as the expansion take-up element of the expansion neutralizer made up of said lever and the said two bars.

The rule for determining the length of lever 32 and location of its co-operating abutment, will hold good for the various different kinds of metals that may be used in the expansible bars of the expansion neutralizer. The length of expansion take-up element or lever 32 will, of course, be modified by various different factors. For instance, it will be modified by the relative co-efficient of expansion of the two metal bars and also by the distance, for example, that the rear end of bar 28 is raised above the underlying portion of bar 27, in which or against which said lever is seated or arranged to rock; but when the length of lever has been determined, as above indicated, it will hold good for all of the varying temperatures to which the expansion neutralizer may be subjected, and the proper action of said device will not be affected by or have any relation to the temperature applied to the sole plate of the iron.

It has now been shown that the front abutment 25 will maintain a fixed and unchanging position in respect to the rear abutment and to the rear portion of the sole plate, it becomes an obvious matter that the supply switch will be controlled entirely by expansion and contraction of the sole plate and, moreover, by the expansion of the very bottom portion of said plate. Normally, or when the sole plate is cold, and up to the time that it reaches a predetermined maximum temperature, the switch will remain closed. When, however, the lower end of switch-actuating lever 40 is moved forward, by expansion of the sole plate, due to maximum desired temperatures thereof, said lever 40 will be rocked on the abutment 25 (the latter operating as a fulcrum) and the upper end of said lever by engagement with the lugs 39, will open the switch.

Even the maximum expansion of sole plate will represent only a few thousandths of an inch in movement and not sufficient to quickly or properly open the switch. Here it should be noted that, in the first place, movement imparted directly to lugs 39 will be multiplied about eight times through each lever 33, thereby causing each thousandth of an inch of expansion of the sole plate to impart approximately sixteen-thousandths of an inch of separating movement to the contact tips 36. This will give the desired separating action of the contacts.

Obviously, when the sole plate cools so as to reduce the temperature thereof but very slightly below the predetermined desired maximum temperature, the switch will be again closed under the tension of the spring 38. Thus, as has been proven in practice, an electrically heated flatiron may be kept substantially at constant desired temperature. This predetermined desired maximum temperature, however, may be varied by oscillating the screw 23 to which the rear abutment 22 is attached. The insulating tiles 12, earlier described, not only afford the best kind of insulation for the electrical heating elements, but properly position and place the heating elements close to the bottom of the sole plate. Moreover, said tiles make possible a flatiron of very light weight which, of course, is known to be a desirable feature.

From the foregoing, it will be understood that the invention illustrated in the drawings is capable of a wide range of modifications. An expansion neutralizer which, in itself is expansible and contractable, but which is arranged to act in such manner as to definitely and unchangingly space distant abutments and the like when subjected to varying degrees of temperature, is thought to be broadly new and as such is here claimed.

What I claim is:

1. An expansible and contractable body member, electrical heating means applied to said body and including a switch, means for controlling the action of said switch including an expansion neutralizer which, in itself is expansible and contractable, said neutralizer comprising heat responsive members tied together adjacent one end and having means connecting opposite end portions to said body member so as to maintain distant points on said expansion neutralizer at constant distance, regardless of such expansion and contraction and of expansion and contraction of said body, and a switch actuator operatively connected to said body and to one of the fixed points of said expansion neutralizer.

2. The combination with an expansible and contractable body and means for applying heat thereto, of abutments, one of which is anchored to the body and the other of which is located at a point distant from said anchored point, an expansion neutralizer connecting said abutments, said neutralizer including two bars having different co-efficients of expansion tied together adjacent one of said abutments, and a lever connected to the other abutment and to the free ends of said two bars, and a heat supply regulating element operatively connected to said body and cooperating with one of said abutments.

3. An expansible and contractable body member, electrical heating means applied to said body and including a switch, two abutments, one of which is anchored to said body and the other of which is located at a point distant from said anchored point, a switch-actuating lever fulcrumed on said last named abutment and operatively connected to said body, and an expansion neutralizer comprising two bars having different co-efficients of expansion, said bars being tied together adjacent their connection with said last named abutment, and a lever connected to the other abutment and to the free ends of said two bars and operative to compensate for the expansion and contraction of said bars and thereby to maintain said abutments at constant distance regardless of expansion and contraction.

4. An expansible and contractable body member, electrical heating means applied to said body and including a switch, abutments, one of which is anchored to said body and the other of which is located at a point distant from said anchored point, a switch-actuating element connected to one of said abutments and to said body, and an expansion neutralizer connecting said two abutments and comprising two bars having different co-efficients of expansion, said bars being tied together adjacent one of said abutments, and a lever fulcrumed onto said other abutment and connected to said two bars.

5. In a flatiron, the combination with the sole plate thereof and electrical heating means therefor including a switch, of front and rear abutments, one anchored to the heel or rear end of said sole plate and the other slidably mounted on the toe or front end thereof, a switch-actuating element connected to said front abutment and to said sole plate, and an expansion neutralizer connecting said abutments and which, in itself, is expansible and contractable, said neutralizer comprising heat responsive members tied together adjacent said front abutment and having means connecting relatively movable portions of said members to said rear abutment to maintain said abutments at a constant distance regardless of such expansion and contraction and of expansion and contraction of said body.

6. The structure defined in claim 4 in which said switch-actuating element is a lever, the lower end of which is seated in the bottom of the body member, the intermediate portion of which is fulcrumed against the co-operating abutment, and the upper end of which is directly operative on said circuit-controlling switch.

7. The structure defined in claim 4 in further combination with means for bodily adjusting one of said abutments with respect to the other to vary the degree of temperature in said body member required to actuate said switch actuating element.

8. The structure defined in claim 4 in which said switch-actuating element is a lever, the lower end of which is seated in the bottom of the body member, the intermediate portion of which is fulcrumed against the co-operating abutment, and the upper end of which is directly operative on said switch, and further in which said switch comprises two-contact-carrying levers mounted on pivots that are stationary in respect to the abutment with which said switch-actuating lever is engaged.

9. The structure defined in claim 1 in which said switch includes a contact-carrying lever mounted on a pivot that is fixed in respect to one of the points of said expansion neutralizer.

10. The structure defined in claim 3 in which said switch includes a contact-carrying lever mounted on a pivot that is adjacent and fixed in respect to the abutment to which said switch-actuating lever is fulcrumed.

11. In a flatiron, the combination with the sole plate thereof and electrical heating means therefor including a switch, of front and rear abutments, the rear abutment being anchored to the sole plate and the front abutment being free for movement with respect thereto, a switch-actuating lever seated at its lower end in the bottom portion of said sole plate and fulcrumed to said front abutment, said switch including a lever mounted on a pivot adjacent and fixed in respect to said front abutment and having a short projection arranged to be engaged by the upper end of said switch-actuating lever, and an expansion neutralizer connected to the front abutment and comprising two metallic bars having different co-efficients of expansion, said bars being tied together adjacent the front abutment, the free ends of said bars being separated, and a lever anchored at its lower end to said rear abutment with its intermediate portion fulcrumed to the free end of the bar having the lower co-efficient of expansion and with its upper end connected to the free end of the bar having the higher co-efficient of expansion.

12. In a flatiron, the combination with the sole plate thereof and electrical heating means therefor including a switch, of a rear abutment anchored to the rear portion of said sole plate, a front abutment slidably mounted at the front portion of said sole plate so as to be free from expansion and contraction thereof, a switch-actuating lever seated at its lower end in the bottom portion of said sole plate and fulcrumed to said front abutment, and an expansion neutralizer comprising two closely associated metallic bars having different co-efficients of expansion, the front ends of said bars being tied together and connected to said front abutment and the rear ends of said bars being free for expansion and contraction, and a lever connected to said rear abutment and to the free ends of said expansible bars, and arranged to neutralize and absorb the expansion and contraction of said two bars and maintain said two abutments spaced at constant distance regardless of expansion and contraction in said bars and sole plate, and whereby said switch actuator and switch will be operated by and in accordance with expansion and contraction of said sole plate.

13. The structure defined in claim 12 in which said switch includes a contact-carrying lever pivotally mounted adjacent the connected front ends of the bars of said expansion neutralizer and directly subject to the action of the upper end of said switch-actuating lever.

14. An expansible and contractable body member, means carried by said body member for applying heat to said body member, an element carried in heat exchange relationship to said body member, anchoring means fixing a part of said element with respect to said body member, a second element comprising heat responsive means connected to said first element and to said anchoring means for maintaining a remote part of the first element at substantially constant distance from said means, and lever means operatively connected to said body member and heat applying means and swiveled to the remote part of said first element for maintaining said body member at substantially constant temperature.

15. An expansible and contractable body member, means carried by said body member for applying heat to said body member, means for regulating said heat applying means comprising a lever operatively connected to said body member and to said heat applying means, and fulcrum means for said lever comprising a bimetallic element having relatively movable portions and a portion fixed with respect thereto, said last mentioned portion having pivotal connection with said lever, and a second lever means connected to each of the relatively movable portions of said element and to said body member at a point remote from said first mentioned lever.

16. An expansible and contractable body member, means carried by said body member for applying heat thereto, a thermal compensating element carried in heat exchange relationship to said body member, said element comprising relatively movable parts and a part fixed with respect thereto, a lever connecting each of the relatively movable parts of said element to a fixed point on said body member, and means for regulating said heat applying means comprising a second lever swiveled to the fixed part of said element and anchored to said body member at a point remote from said first mentioned lever, whereby to maintain said body member at a substantially constant temperature.

FRANK W. CARPENTER.